United States Patent
Cubit et al.

(10) Patent No.: US 10,232,821 B1
(45) Date of Patent: Mar. 19, 2019

(54) SMART BUCKLE

(71) Applicants: Stacey Lyn Cubit, Stuart, FL (US); Jorge Alfonso Pacheco, Miami Beach, FL (US)

(72) Inventors: Stacey Lyn Cubit, Stuart, FL (US); Jorge Alfonso Pacheco, Miami Beach, FL (US)

( * ) Notice: Subject to any disclaimer, the term of this patent is extended or adjusted under 35 U.S.C. 154(b) by 0 days.

(21) Appl. No.: 15/615,793

(22) Filed: Jun. 6, 2017

(51) Int. Cl.
| | |
|---|---|
| *B60R 25/10* | (2013.01) |
| *B60N 2/00* | (2006.01) |
| *B60N 2/28* | (2006.01) |
| *B60R 25/01* | (2013.01) |
| *B60R 25/31* | (2013.01) |
| *G08B 21/02* | (2006.01) |
| *A44B 11/25* | (2006.01) |
| *E05F 15/73* | (2015.01) |

(52) U.S. Cl.
CPC ...... *B60R 25/1001* (2013.01); *A44B 11/2569* (2013.01); *B60N 2/002* (2013.01); *B60N 2/2812* (2013.01); *B60R 25/01* (2013.01); *B60R 25/31* (2013.01); *G08B 21/02* (2013.01); *E05F 15/73* (2015.01)

(58) Field of Classification Search
CPC ..... B60R 25/1001; B60R 25/01; B60R 25/31; A44B 11/2569; B60N 2/002; B60N 2/2812; G08B 21/02; E05F 15/73
See application file for complete search history.

(56) References Cited

U.S. PATENT DOCUMENTS

| | | | | |
|---|---|---|---|---|
| 9,424,728 | B2 * | 8/2016 | Rambadt | B60N 2/002 |
| 9,789,786 | B2 * | 10/2017 | Westmoreland | B60N 2/002 |
| 2003/0160689 | A1 * | 8/2003 | Yazdgerdi | B60N 2/2812 340/457.1 |
| 2006/0061201 | A1 * | 3/2006 | Skinner | B60R 22/00 297/468 |

(Continued)

*Primary Examiner* — Brian A Zimmerman
*Assistant Examiner* — Sara B Samson
(74) *Attorney, Agent, or Firm* — Tiburon Intellectual Property, PLLC; Frank M. Washko

(57) ABSTRACT

A key ring transceiver module activates when a child has been left inside of a car seat when the corresponding buckle transceiver is out of range. The buckle transceiver system includes a weight sensor indicating that a child is inside of the baby seat, a pair of limit or indication switches indicating that a child is retrained within the baby seat, and a pair of PING/PONG sending and receiving radio pairs that communicate range of the baby buckle transceiver from the key ring transceiver. When the baby seat contains a child restrained within, and the transceiver moves out of range, a distress alarm/signal will be enabled on the transceiver to indicate that the baby is still confined to the restraints of the baby seat. The key ring transceiver will continue to signal a distress mechanism until the baby buckle transceiver trigger has been reset by removing the child from the car seat. Although several variations of the embodiment have been presented with similar computational schemes, this present embodiment contains the minimal number of necessary component for effective alerting, and fulfills several requirements of exception to previous system designs. Lastly most systems to date have incorporated elements of the vehicle, which can require OEM installation or absorbent aftermarket fabrication to the vehicle.

18 Claims, 5 Drawing Sheets

(56) References Cited

U.S. PATENT DOCUMENTS

| | | | | |
|---|---|---|---|---|
| 2007/0229244 | A1* | 10/2007 | Peeler | B60R 22/48 340/457.1 |
| 2010/0078978 | A1* | 4/2010 | Owens | B60N 2/002 297/250.1 |
| 2010/0253498 | A1* | 10/2010 | Rork | B60N 2/002 340/457.1 |
| 2013/0278401 | A1* | 10/2013 | Flaherty | G08B 6/00 340/407.2 |
| 2014/0284975 | A1* | 9/2014 | Manimbo | B60N 2/002 297/217.4 |
| 2016/0210833 | A1* | 7/2016 | Pinder | G08B 21/02 |
| 2016/0272150 | A1* | 9/2016 | Doshi | B60R 22/48 |
| 2017/0120813 | A1* | 5/2017 | Wilson | B60Q 9/00 |
| 2018/0078001 | A1* | 3/2018 | Babin | A44B 11/2511 |

* cited by examiner

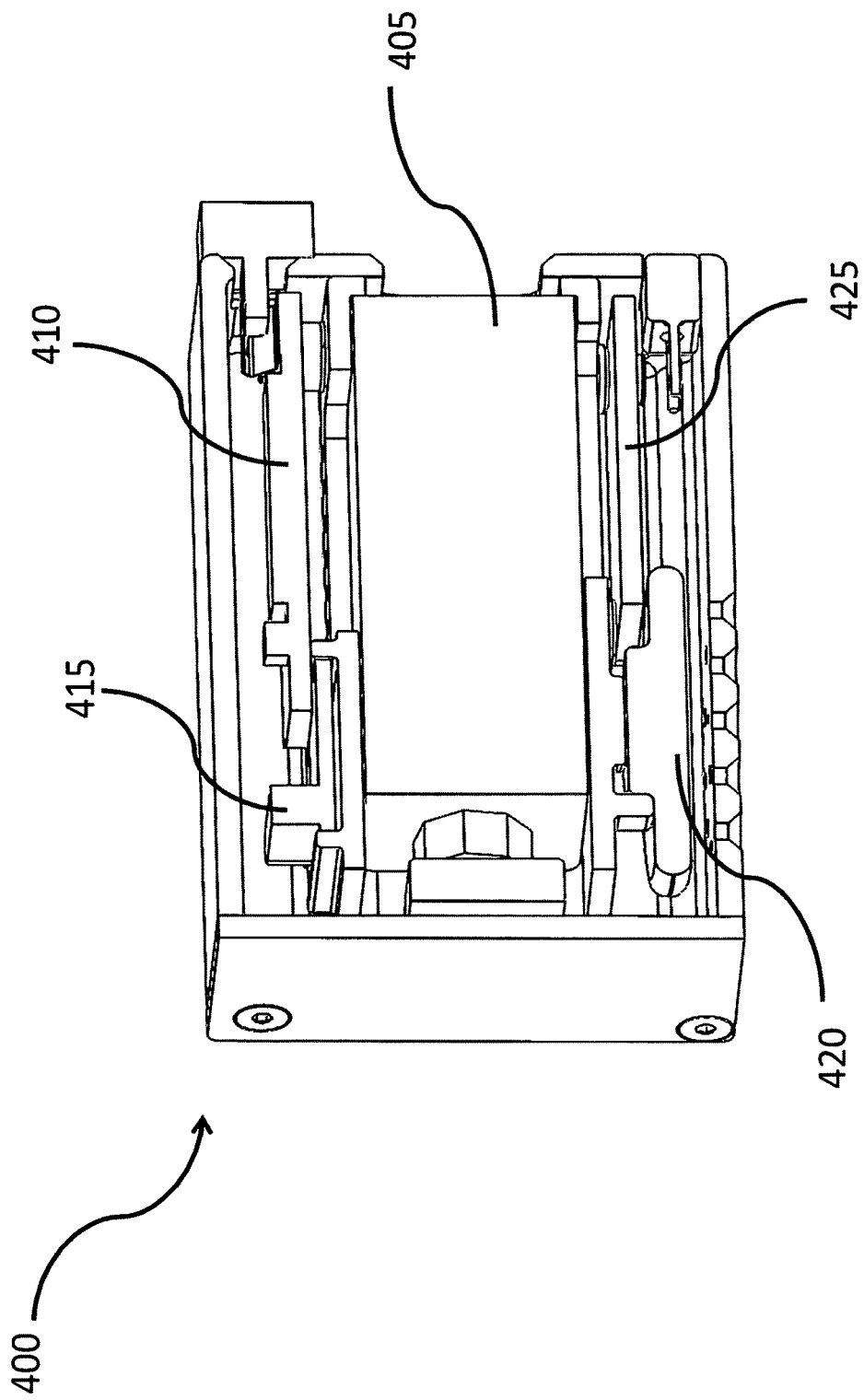
FIGURE 4.A

SMART BUCKLE

FIELD OF THE INVENTION

This relates to baby seat alarms and particularly to seat belt alarm systems that activate when the baby buckle seat is out of range of the key ring transceiver.

BACKGROUND OF THE INVENTION

Fatalities due to children left in car seats continue to grow each year. Every year a number of children left in vehicles are found dead due to prolonged exposure of harsh closed system environments. Fatalities generally occur when guardians are in a hurry and make forgetful decisions about the child left in the car seat. As expected several items have been developed and continue to be developed in order to resolve this problem. The primary challenge with developing a robust and worthwhile solution has come in the form of minimizing the number of inputs required from the guardian and developing a failsafe system that does not depend on vehicle conformity. Various embodiments of the alarm have been developed such as motion sensing systems U.S. Pat. No. 5,793,291, a system by which the alarm presents itself to when the vehicle has been turned off U.S. Pat. No. 6,104,293, and additionally U.S. Pat. No. 6,924,742 which utilizes an ignition key mechanism by which a mechanism detects whether or not a key is in the ignition through various sensing mechanisms, i.e. light, magnetic flux, pressure, etc.

While all previous patents contain varying degrees of merit, the challenge lies within developing a system that contains a minimal amount of installation and awareness from the guardian. Furthermore the system must be a cost effective solution, and contain a modest lifespan of utilization. Lastly when the system needs attention, the system should make the guardian aware that initiation should be taken to update the system. U.S. Pat. No. 6,924,742 utilizes a signal relay protocol that states when the key has been placed in the ignition and removed for some period of time alongside the child being confined to the child seat; an alarm should then be triggered. However for example this fails to address the situation therein that contains a guardian inserting the child into the seat, closing the car, and simply returning to a forgotten item that they may have left in a store. If they key was never inserted into the ignition, the system will fail to arm. Additionally problems arise with movement and pressure systems. The primary fault with these type systems is when a child becomes ill due to excessive heat, being motionless is a product of the environment state. Excessive heat will cause fatigue and fainting thus causing loss of consciousness and inevitably motion. Lastly U.S. Pat. No. 5,793,291 combines the effects of temperature with motion, however temperatures will not change drastically enough in a minute temporarily cooled environment even after the guardian has left.

Most systems as described above contain elements to which exceptions denote them as problematic. Therefore a more comprehensive solution is required to ensure that all elements of the problem of a child being left in a car seat are addressed. One additional such instance is the (BBRRS) solution presented requires no user input, with the exception of replacing a battery in the transceiver when the transceiver indicates low power.

BRIEF SUMMARY OF THE INVENTION

A seat belt alarm system indicated as the baby buckle range response system (BBRRS) comprises a primary seat belt buckle (SBB) with an embedded transceiver and a corresponding key ring transceiver (KRT). The SBB contains two primary input sensors including a force sensor for indicating when the child has been placed in the BBRRS, and additionally sensors/limiting switches for indicating when the child has been buckled into the SBB. While limiting operators are implemented here, variations of this adaption may include switches of other types that detect magnetism or optical relays to provide analogous feedback information. The BBRRS operates under two primary electrical modes. When the KRT is initially out of range of the SBB and the armed state is triggered to low (un-armed state) because no child is located in the seat nor buckled in, BBRRS operates on a low voltage setting utilizing minimal power consumption. When the KRT comes into range yet the SBB is in its un-armed state, a handshake operation is performed to indicate that the KRT is in range and to switch to an increased voltage state in preparation for system implementation. When the system has been moved the elevated voltage state, an LED located on the front of the SBB will light up blue confirming the readiness operation state. The voltage source for both cases of electrical power distribution is a direct power source, i.e. for charging the SBB, and when no direct power source is available a built in battery source takes operation. The KRT operates on a battery source only and voltage regulation is commanded via internal microcontroller.

When the BBRRS has been placed in the elevated voltage state, the SBB will indicate ready by a low power blue LED. Any color may be indicative of a ready state, however red and green were selected as system not ready, and ready respectively. When the child has been placed into the seat and the force sensor detects the presence of the child and the SBB is triggered to an armed state (high) per this component. A variant of this component may be additionally being elements that close a circuit or complete a feedback system such as electricity, optical, or magnetic components. Additionally when the child has been buckled in with both seat belt straps, primarily across the chest region, the SBB detects two further high trigger conditions and sets the entire system to an armed (high) state. The SBB requires a total of three high trigger conditions in order to arm the entire system. When the system has been properly move into a fully armed state by all three triggers, the LED on the SBB will light green. Otherwise if ⅓ or ⅔ triggers are in the armed state, but two or one are not the SSM will light red to indicate the BBRRS is not ready for operation. For the embodiment of the SBB it is understood that the general shape of any such device is an enclosure with such cavity that a tongued-shaped extrusion may be inserted inside with the accepting cavity match. The external design of the enclosure may change depending on branding or company representation at the time, however its core competency remains as stated above.

Once the SBB is in the fully armed state, the SBB and KRT will begin to communicate a series of messages that describe the range between the two devices. The KRT contains the primary horn or alert mechanism, which may be an audible sound, lighting device, vibration device, or other method of alerting the individual when the SBB has indicated that the range of the KRT is not permissible while the armed state of the SBB implemented. If the range alert of the SBB is sent to the KRT, the KRT will begin to sound an alarm and do so until the SBB is moved to the un-armed state by removing the child from the seat. Additionally in some variations of the BBRRS, additions of the alarm may be added that incorporate elements of the vehicle such as the vehicular horn, doors, windows, etc. to open or respond accordingly. Transceiver components for the SBB are located internally and only the force/pressure sensor for the seat is external to the SBB. The BBRRS can be installed in any existing infant seat and child car seat, as it is not dependent on any internal components therein.

BRIEF DESCRIPTION OF THE DRAWINGS

FIG. 4.B is a flow chart diagram indicating when the KRT should sound the horn/alarm.

DETAILED DESCRIPTION OF THE INVENTION

The seat belt alarm system defined as the range response system serves to present the operator of a vehicle that a child has been left in the car seat, and the driver is an unsafe distance way. This most commonly presents itself as an inadvertent or loss of memory regarding the situation. The alarm is then armed by the child being placed into the seat and properly buckled. A handshake communication then occurs between the buckle transceiver and key ring transceiver. If an unsafe distance has been acquired by the key ring transceiver from the buckle transceiver, a horn/alarm is sounded. Please note that there are two components to the Baby Buckle Range Response System (BBRRS). The first has been called the Safety Seat Buckle (SBB) and second has been called the Key Ring Transceiver (KRT).

Figure 1:
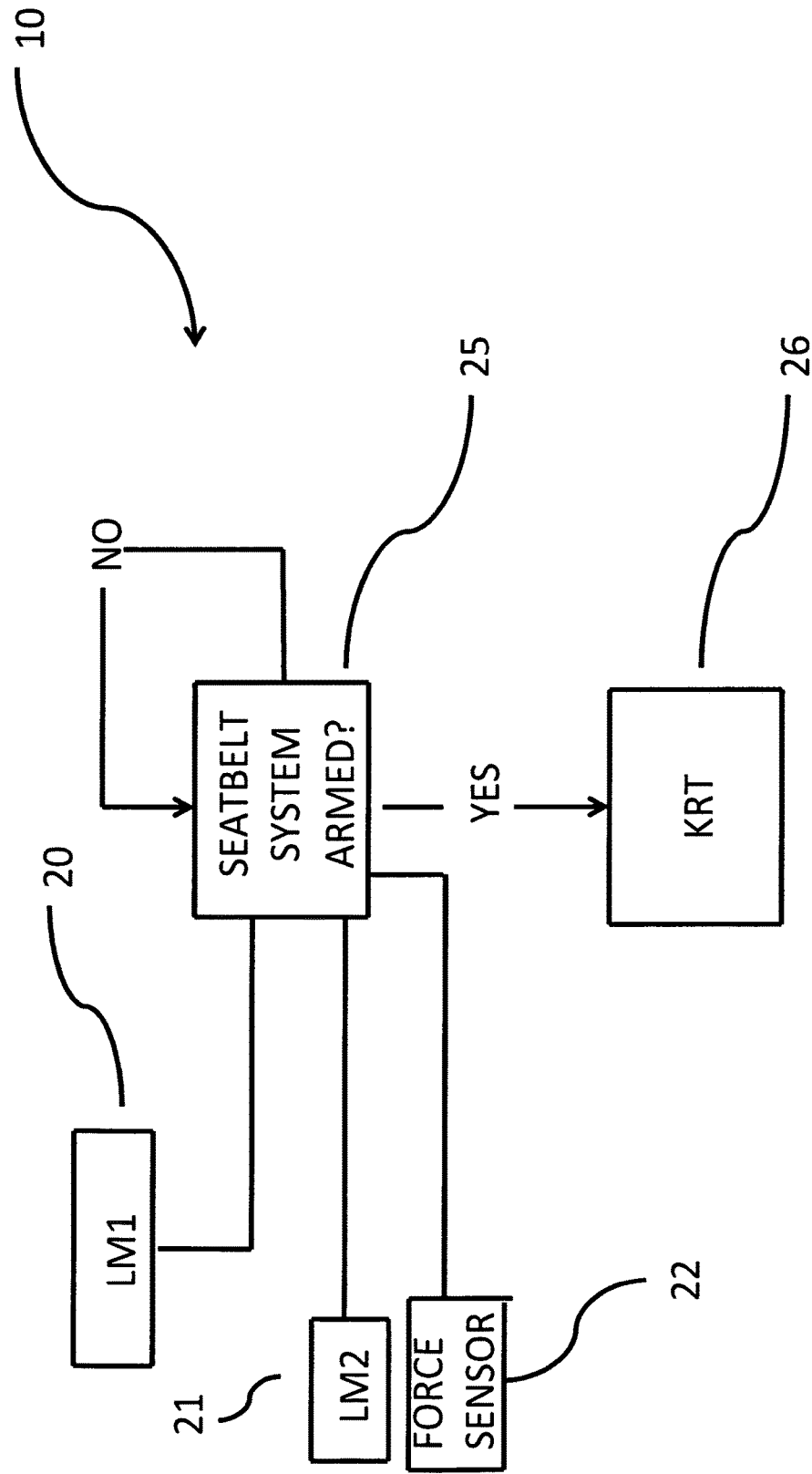
FIG. 1. is a flow chart displaying the early steps of the conditionals required to operate the system alongside the activation method of the alarm as seen by the SBB.

FIG. 1. is a flow chart displaying the early steps of the conditionals required to operate the system alongside the activation method of the alarm as seen by the SBB 10. Note that for the purposes of the figure, the case of the KRT not in range to the SBB in an unarmed state will not be presented. It is an operational state but not the state of interest to provide alert in the event of an emergency. The SBB 10 operates with limit switch 20 and 21 alongside force sensor 22. Note that in this particular embodiment limit switches are used which are a mechanical device, however a plethora of other current and future technologies may take its place. Additionally note that two limit switches are used currently to agree with seat belt operation however in the future, other technologies may require only the use of 1 limit switch.

The limit switch as utilized is simply to present a conditional to the SBB 10 operation. The force sensor 22 is implemented to provide notice to the system that direct mass has been applied to the seat. As mentioned above, applying only one conditional to the system is not sufficient to move the system to an armed state. Therefore a user placing a nominal item in the baby seat is not sufficient to arm the system. Additionally note that force sensor 22, is understood to be placed inside of a baby/car seat. It does not have to be formally integrated into the seat and can be an aftermarket installation. Furthermore in this embodiment this force sensor 22 is connected to the system directly via wire, but in future embodiments may be completely wireless. Once the system has been moved received the three high conditionals above, the system moves into an armed stage referenced by numerical 25. Once the SBB is in the armed stage, it begins to signal to the KRT a handshake communication protocol that a proper mass has been received. Proper here is used to denote acceptable and this step is reference by numerical 26.

Figure 2:
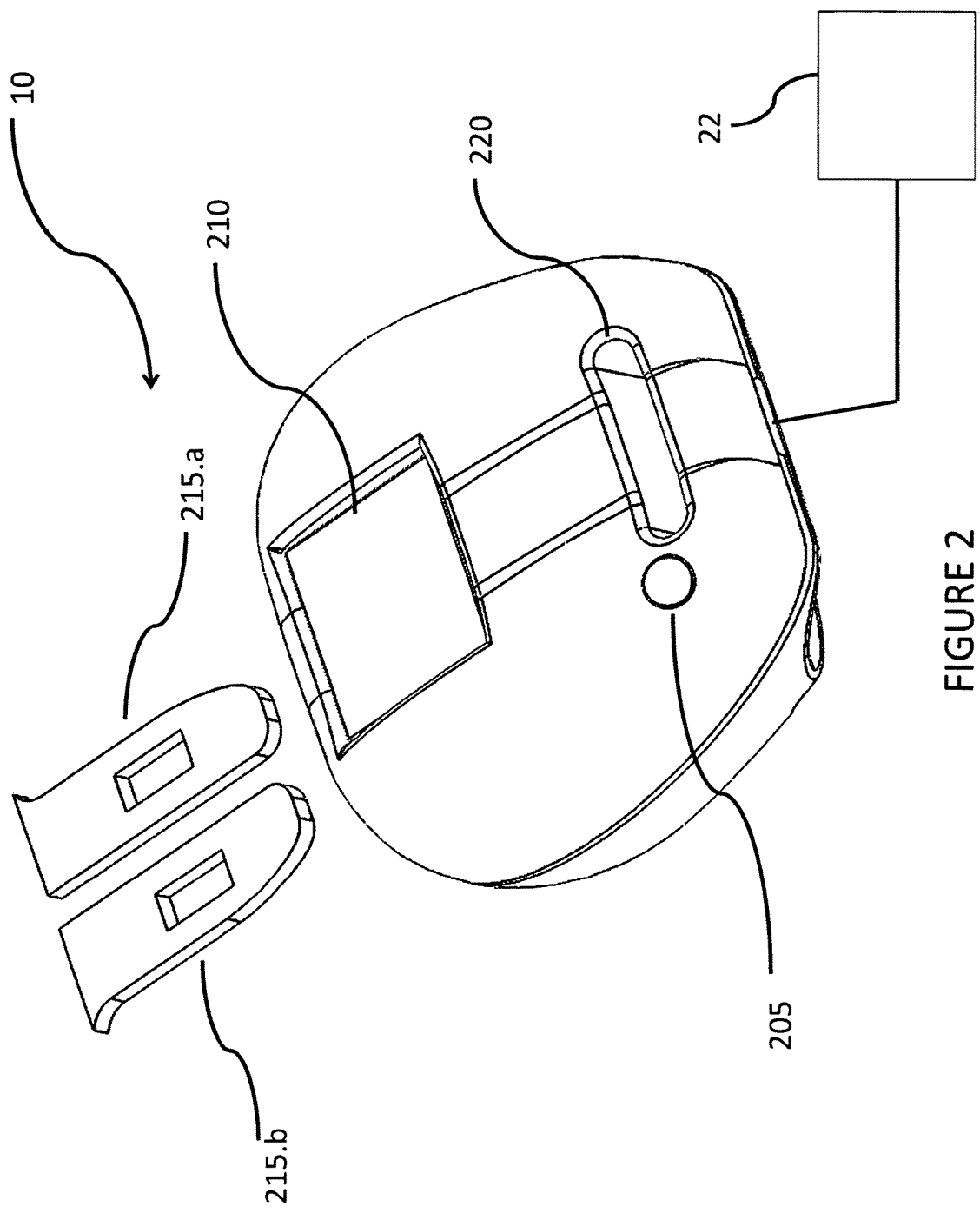
FIG. 2. is an isometric view of the SBB displaying the signaling method for confirmation of readiness and insertion of the buckle tongues.

FIG. 2. is an isometric view of the SBB 10 with displaying external components required for operation. The SBB 10 operates with the traditional two-tongued approach for securing the restraint of the child. Note that other embodiments may be taken into consideration including a single tongue system if a harness type restraint were utilized. The tongues 215.a and 215.b are presented here as a form of physical completion to the notion of restraint. In other embodiments they could be and are not limited to snaps, locks, and future connection terminals. Additionally the SSB 10 contains a release system 210 for the tongues 215.a and 215.b. In this embodiment it is presented as a button however in others may be a switch release, latch release, etc. The LED indicator 205 is provided on the front of the unit to indicate the current state of the system.

When the KRT comes into range in an un-armed state; the LED indicator 205 will illuminate blue. When the SBB 10 has been placed into an armed state, the LED indicator 205 will illuminate green. If the one or two of the conditional has been met, LED indicator 205 will illuminate red. When a red illumination by the LED indicator 205 is presented, the user understands to check the system for a failed restraint connector. This of course states that the restraint is not properly fastened. Recent news data has shown that moreover child fatality is sometimes caused by the failure of the child to be restrained to the seat. Therefore the illumination system serves to provide confirmation to the restraint mechanism. The SBB 10 additionally contains a method to attach the system to a standard child seat. This is seen as terminal attachment point 220. Note that in the referenced body of the SBB 10 it is presented in a standard buckle attachment, denoted by an ovular shape. This is simply an understood form but is not limited to other geometric shapes.

Figure 3:
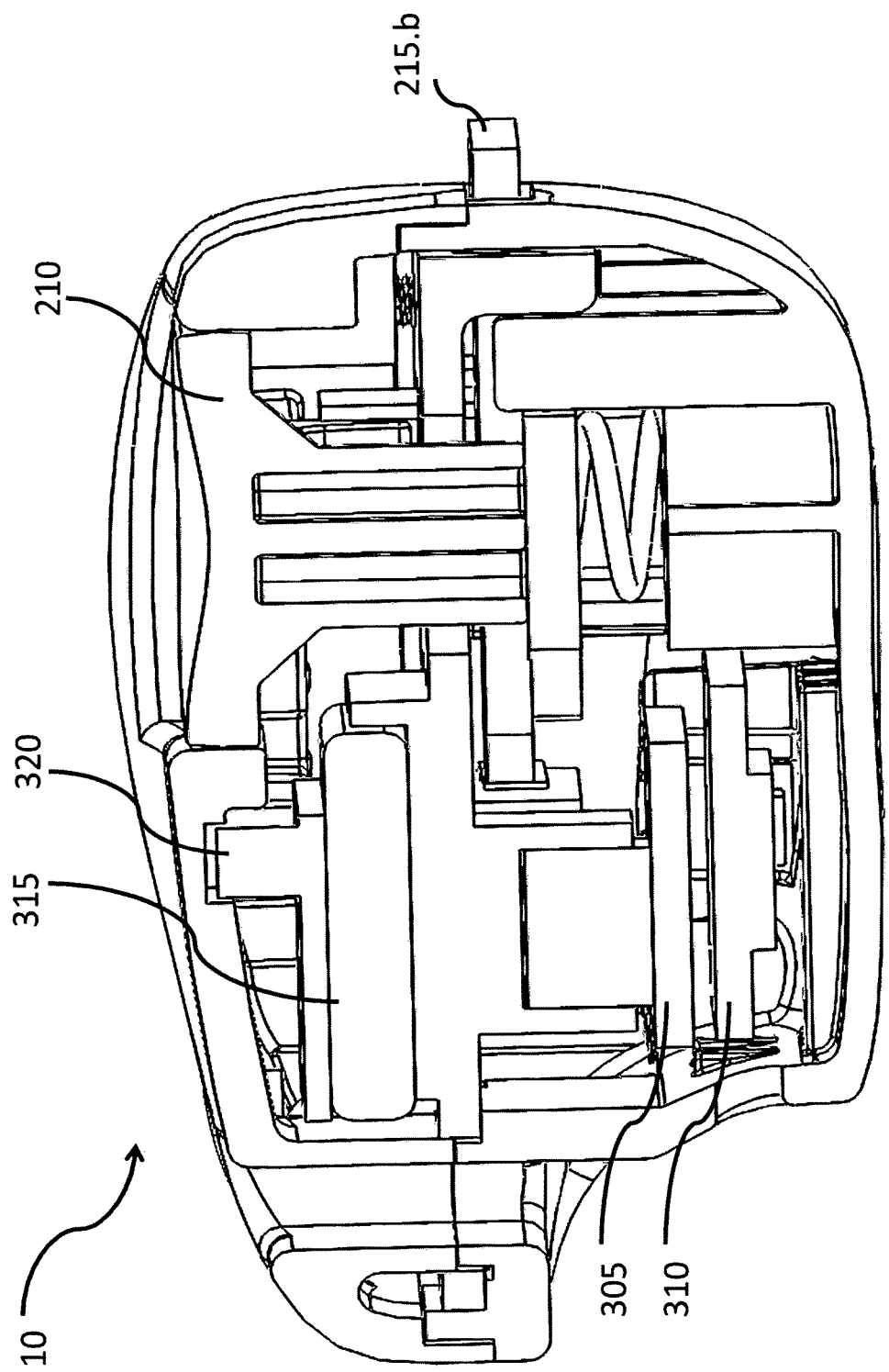
FIG. 3. is a cross sectional view of the SBB displaying internal power components, communication components, and switches enabling wireless command of the KRT.

FIG. 3. is a cross sectional view of the SBB 10 displaying internal operational components. While the vehicle is on, power is supplied directly to the SSB 10 through charging port 305. This charging port is typically of type USB, but if desired may be other variations. Logic control to the SSB 10 is provided via printed circuit board (PCB) 310. The PCB commands and receives all internal electrical and signals required to operate the SBB 10. When the system is not directly supplied power from charging port 305 such as when the car has been turned off, the onboard battery pack 315 provides operational power to the system. In order to communicate to the KRT, the SBB 10 is provided with a transceiver 320 mounted just above the battery to prevent any undesired radio interferences.

In most buckle assemblies, a metal plate is used to anchor all physical components in place, and placing the transceiver under this metal plate where the PCB 310 is located could provide communication problems. Therefore the transceiver 320 is located near the top most, external wall. Wall materials are typically a hardened thermoplastic, which does not provide radio interference. The transceiver 320 is as such and not simply a transponder because when the KRT comes into range, the transceiver 320 requires to both send and receive signals denoting the PING/PONG style communication. This additionally allows the low voltage communication setting by the SBB 10 to be enabled. One limit switch 20 is seen internally as being pressed down by tongue attachment 215.*b*. Lastly the release of the tongue attachment 215.*b* is provided by a release system 210.

Figure 4B:
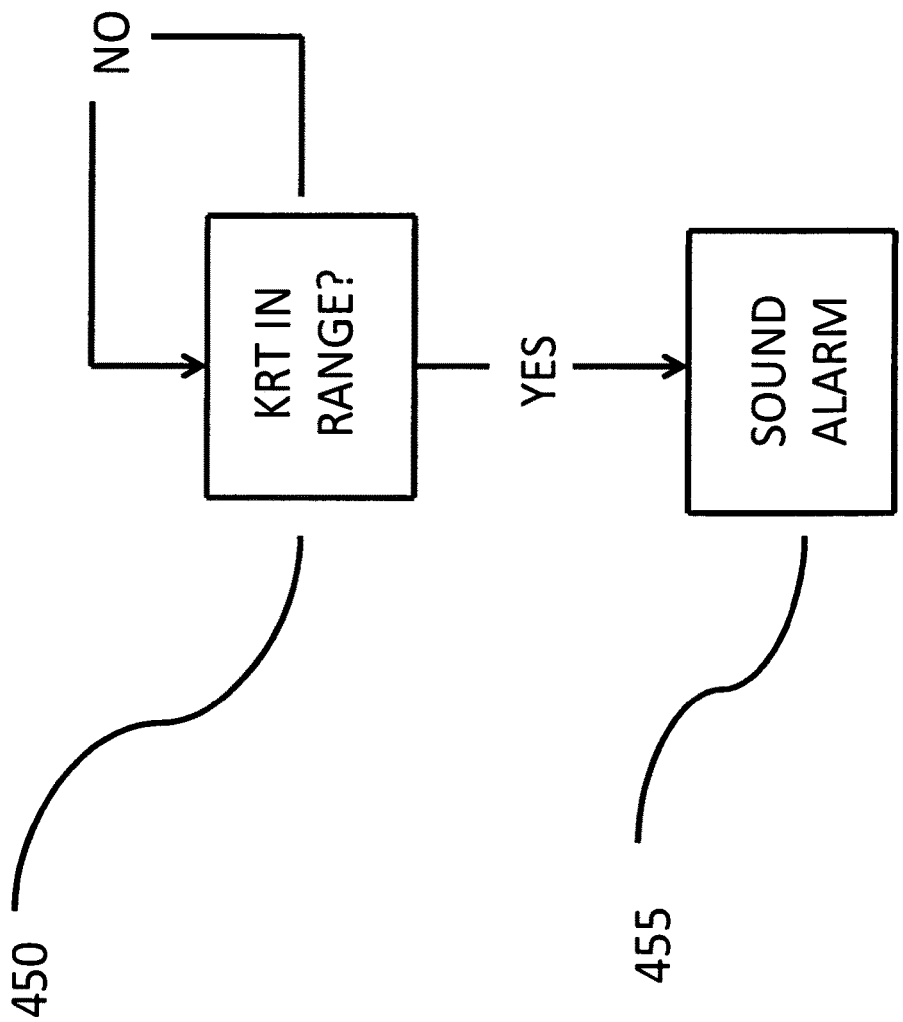
FIG. 4.A is a cross sectional diagram of the KRT indicating power and communication components.

FIG. 4.A is a cross sectional image of the key ring transceiver (KRT) 400 displaying internal power and operational components. For the KRT 400 B seen in FIG. 4, the casing is rectilinear wherein some instances the casing may be circular, ovular, or polygonal depending on aesthetic characterization. On board power is supplied to the KRT 400 via battery power supply 405. The battery may be of single use or rechargeable depending on the configuration at the time. In testing to various prototypes both have shown promise for full operational power. The battery supply may be of any type, but more commonly of chemical type. In the particular embodiment the battery power supply 405 is located in the center. Similar to the SBB 10 in FIG. 3, the KRT 400 contains a printed circuit board (PCB) 410 for onboard logic control. Communication between the SBB and the KRT 400 is provided via a transceiver 415. Location for the KRT 400, is not as applicable as on the SBB, due to the casing of the KRT 400 being of all thermoplastic type. When the KRT 400 has computed the information regarding the SBB is too far for the prescribed range settings, the KRT 400 will sound a horn/alarm 420. In this embodiment for the alarm 420 is a piezo speaker, however in other instances it may be a light, buzzer, or combination thereof. For the current embodiment a amp board 425 has been shown to increase the volume of the speaker if required depending on the preference of the user. Note that when the KRT 400 has signaled the alarm, it will continue to do so until the SBB has indicated to the KRT 400 that the child is no longer in any danger.

FIG. 4.B is a flow diagram depicting the logic control to the KRT 400 as seen when in the event of an armed state by the SBB. If the KRT 400 is in range of the SBB, and the child is in no danger with an armed state on the SBB the KRT will sample the outgoing data provided by the SBB. This step is seen of the reference numerical 450. In the event that the KRT 400 moves out of range of the SBB, the alarm will sound as indicated by reference numerical 455.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

What is claimed is:

1. An seat belt alarm system comprising:
   a seat belt buckle apparatus comprising:
      a pressure sensor operable to activate when a mass of an infant is detected a car seat associated with the seat belt buckle apparatus;
      at least one additional sensor within a buckle assembly of the seat belt buckle apparatus, wherein the at least one additional sensor is operable to activate when an infant has been buckled into the car seat; and
      a seat belt buckle transceiver for activating a transmission to a remote key ring transceiver when the seat belt buckle apparatus is armed, wherein the seat belt buckle apparatus is armed when the pressure sensor and the at least one additional sensor are activated;
   a key ring transceiver for receiving the transmission from the seat belt buckle apparatus, wherein the key ring transceiver comprises an alert mechanism operable to activate when the key ring transceiver moves out of a predetermined range from the seat belt buckle apparatus while the seat belt buckle transceiver is armed, wherein the seat belt buckle apparatus is set to a low voltage state when it is unarmed and the key ring transceiver is out of a predetermined range from the seat belt buckle apparatus.

2. The seat belt alarm system of claim 1, wherein the key ring transceiver further comprises a power supply and a logic controller.

3. The seat belt alarm system of claim 1, wherein an illumination device on a front of the seat belt apparatus is operable to indicate a current state of the seat belt alarm system, wherein the current state can be selected from the group consisting of: a restraint mechanism associated with the seat belt buckle apparatus has failed; the restraint mechanism is fastened and the seat belt buckle apparatus is armed; and the seat belt buckle apparatus is unarmed.

4. The seat belt alarm system of claim 1, wherein the alert mechanism produces an audible alert sound.

5. The seat belt alarm system of claim 1, wherein the alert mechanism is operable to vibrate to indicate that the infant is in danger.

6. The seat belt alarm system of claim 1, wherein the alert mechanism is operable to perform a transient illumination pattern from a light source to indicate the child is in danger.

7. The seat belt alarm system of claim 1, wherein the alert mechanism is operable to remain activated until the seat belt buckle apparatus is unarmed.

8. The seat belt alarm system of claim 1, wherein the key ring transceiver is built directly into a key of operation for an automobile.

9. The seat belt alarm system of claim 8, wherein the key ring transceiver is designed to integrate with other functions built into the key of operation of the automobile, wherein the other functions are selected from a group consisting of: controlling doors, controlling windows, locking a car alarm system.

10. The seat belt alarm system of claim 1, wherein the seat belt buckle transceiver is unarmed when the pressure sensor or the at least one additional sensor is deactivated.

11. The seat belt alarm system of claim 1, wherein the seat belt buckle apparatus is set to a higher voltage than the low voltage state when it is unarmed and the key ring transceiver is inside of a predetermined range from the seat belt buckle apparatus.

12. The seat belt alarm system of claim 1, wherein the at least one additional sensor comprises two mechanical limit switches.

13. The seat belt alarm system of claim 12, wherein the two mechanical limit switches are selected from the group consisting of: magnetic switches and optical switches.

14. The seat belt alarm system of claim 1, wherein the pressure sensor is operable to communicate with the seat belt buckle apparatus wirelessly.

15. An seat belt alarm system comprising:
   a seat belt buckle apparatus comprising:
      a pressure sensor operable to activate when a mass of an infant is detected on a car seat associated with the seat belt buckle apparatus;
      at least one mechanical switch within a buckle assembly of the seat belt buckle apparatus, wherein the at least one mechanical switch is operable to activate when an infant has been buckled into the car seat; and a seat belt buckle transceiver for activating a transmission to a remote key ring transceiver when the seat belt buckle apparatus is armed, wherein the seat belt buckle apparatus is armed when at least one of the pressure sensor and the at least one mechanical switch are activated;

a key ring transceiver for receiving the transmission from the seat belt buckle apparatus, wherein the key ring transceiver comprises an alert mechanism operable to activate when the key ring transceiver moves out of a predetermined range from the seat buckle apparatus while the seat belt buckle transceiver is armed, wherein the seat belt buckle apparatus is set to a low voltage state when it is unarmed and the key ring transceiver is out of a predetermined range from the seat belt buckle apparatus.

16. The seat belt alarm system of claim 14, wherein the seat belt buckle apparatus is set to a higher voltage than the low voltage state when it is unarmed and the key ring transceiver is inside of a predetermined range from the seat belt buckle apparatus.

17. The seat belt alarm system of claim 14, wherein the seat belt buckle apparatus receives power through a charging port built into the seat belt buckle apparatus.

18. The seat belt alarm system of claim 14, wherein the seat belt buckle apparatus receives power through a battery pack built into the seat belt buckle apparatus.

\* \* \* \* \*